(12) United States Patent
Smith et al.

(10) Patent No.: US 6,311,216 B1
(45) Date of Patent: Oct. 30, 2001

(54) METHOD, COMPUTER PROGRAM PRODUCT, AND SYSTEM FOR CLIENT-SIDE DETERMINISTIC ROUTING AND URL LOOKUP INTO A DISTRIBUTED CACHE OF URLS

(75) Inventors: Brian J. Smith, Seattle, WA (US); Hans Hurvig, Copenhagen (DK)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/086,843

(22) Filed: May 29, 1998

(51) Int. Cl.[7] ............................ G06F 15/173; G06F 15/16

(52) U.S. Cl. ......................... 709/226; 709/225; 709/229

(58) Field of Search ..................................... 711/118, 122, 711/113, 14; 709/217, 218, 219, 226, 225, 229, 203, 105

(56) References Cited

U.S. PATENT DOCUMENTS

| | | | |
|---|---|---|---|
| 5,341,499 | * 8/1994 | Doragh | 709/301 |
| 5,539,883 | * 7/1996 | Allon et al. | 709/105 |
| 5,603,029 | * 2/1997 | Aman et al. | 709/105 |
| 5,612,865 | 3/1997 | Dasgupta | 364/184 |
| 5,623,595 | 4/1997 | Bailey | 395/182.04 |
| 5,649,093 | 7/1997 | Hanko et al. | 395/182.04 |

(List continued on next page.)

OTHER PUBLICATIONS

Microsoft Corporation. Cache Array Routing Protocol and Microsoft Proxy Server 2.0. World Wide Web: http://www-.microsoft.com. pp. 1–15. 1997.*

Sharp. Super Proxy Script. World Wide Web: http://naragw.sharp.co.jp/sps/sps–e.html. pp. 1–9. Aug. 1996.*

Valloppillil, Vinod and Cohen, Josh. Hierarchial HTTP Routing Protocol. World Wide Web. pp. 1–7, Apr. 1997.*

Valloppillil, Vinod and Ross, Keith W. Cache Array Routing Protocol v1.0. World Wide Web. pp. 1–9. Feb. 1998.*

Briefing on Super Proxy Script, (last modified Aug. 1998), http://naragw.sharp.co.jp/sps/sps–e.html, pp. 1–9.

* cited by examiner

Primary Examiner—Glenton B. Burgess
Assistant Examiner—Nkosi Trim
(74) Attorney, Agent, or Firm—Workman, Nydegger & Seeley

(57) ABSTRACT

A method, computer program product, and system for directly accessing URL data object requests in a proxy server array. A URL data object request is generated by an enabled client to request a URL data object that resides in the local cache of proxy server in an array of proxy servers configured as a distributed cache. The enabled client will deterministically identify the residing proxy server based on information residing thereon without resorting to expensive query-response transactions, such as those that occur in proxy server arrays using ICP, or routing the URL data object request through different proxy servers of the array. An array membership list containing array membership information is available at each and every proxy server as well as all enabled clients. This list is used in conjunction with the URL as the information for identifying the correct proxy server where the URL data object resides. First, a deterministic hash value is computed for each proxy server name and the URL. Next, a combined hash value is computed that combines the URL hash value with each proxy server hash value. Finally, the proxy server with the highest "score" or combined hash value is identified as the proxy server where the desired URL data object should reside in local cache storage. Since the array membership list, the URL, and the hashing algorithm are the same at all enabled clients, the same proxy server will be identified as having the URL data object regardless of which enabled client generated the URL data object request.

17 Claims, 11 Drawing Sheets

U.S. PATENT DOCUMENTS

| | | | |
|---|---|---|---|
| 5,740,371 | 4/1998 | Wallis | 395/200.59 |
| 5,774,660 * | 6/1998 | Brendel et al. | 709/201 |
| 5,787,470 | 7/1998 | DiSimone et al. | 711/124 |
| 5,805,824 | 9/1998 | Kappe | 395/200 |
| 5,826,270 | 10/1998 | Rutkowski et al. | 707/10 |
| 5,864,852 | 1/1999 | Luotonen | 707/10 |
| 5,918,013 | 6/1999 | Mighdoll et al. | 395/200.47 |
| 5,924,116 * | 7/1999 | Aggarwal et al. | 711/122 |
| 5,933,606 | 8/1999 | Mayhew | 395/200.69 |
| 5,933,849 | 8/1999 | Srbljic et al. | 711/118 |
| 5,935,207 | 8/1999 | Logue et al. | 709/219 |
| 5,940,594 | 8/1999 | Ali et al. | 395/200.33 |
| 5,987,233 | 11/1999 | Humphrey | 395/200.47 |
| 5,991,804 | 11/1999 | Bolosky et al. | 709/221 |
| 5,991,809 | 11/1999 | Kriegsman | 709/226 |
| 6,006,251 | 12/1999 | Toyouchi et al. | 709/203 |
| 6,006,264 * | 12/1999 | Colby et al. | 709/226 |
| 6,014,667 | 1/2000 | Jenkins et al. | 707/10 |
| 6,026,405 | 2/2000 | Arda et al. | 707/10 |
| 6,029,168 | 2/2000 | Frey | 707/10 |
| 6,029,195 | 2/2000 | Herz | 709/219 |

* cited by examiner

METHOD, COMPUTER PROGRAM PRODUCT, AND SYSTEM FOR CLIENT-SIDE DETERMINISTIC ROUTING AND URL LOOKUP INTO A DISTRIBUTED CACHE OF URLS

BACKGROUND OF THE INVENTION

1. The Field of the Invention

The field of the present invention is that of the proxy servers used in connection with accessing data over the World Wide Web ("WWW") through the Internet or other Wide Area Network ("WAN"). More particularly, the present invention involves an array of multiple proxy servers configured together to act as a single distributed cache of information identified through the use of Uniform Resource Locators ("URL"). Specifically, the invention treats intelligent or enabled clients that may directly access a desired URL data object from a particular proxy server in a proxy server array having the URL requests laterally routed or transferred amongst array members.

2. Present State of the Art

Generally speaking, the concept of a "cache" or "caching" as used in computer terminology and applications typically means making a more accessible copy of some piece of data for a performance advantage. For example, information that is cached is in many instances more accessible than it otherwise would be so that processing speed is increased since accessing the cached information is quicker.

Since having excess copies of data can create its own sort of overhead and because cache size is limited, data is not typically retained in a cache indefinitely and will eventually be overwritten after a certain amount of time if the cache is being fully utilized. This may occur according to a Leased Recently Used ("LRU") algorithm, an expiration time, or any other relevant criteria for a particular application. Caching commonly exists at the microprocessor level with instruction and data caches so as to avoid excessive accessing of system RAM and may also exist elsewhere in a computer system or in a network of computer systems.

Another form of caching is commonly used in relation to accessing data or information over the WWW. A user having Internet access can directly receive a URL identified data object, such as a web page, and then display it locally on a browser. Each time the user receives such a data object, there is a delay as the Hyper Text Transport Protocol ("HTTP") request travels across the Internet to the location identified by the URL and the destination server processing the URL request responds with the requested data object. Because the data object can be quite large, the time to access the data objects with the HTTP request and response creates a significant amount of information traveling over the Internet connection causing delays and excess overhead.

In some organizations, many of the same data objects are requested by the various users within the organization. It is therefore common to introduce a proxy server that will receive user access requests from a client application, such as a web browser. Referring to FIG. 1, the use of a proxy server acting as a cache is shown. A client application 20 will direct all URL requests to a proxy server 21 that will serve as a cache for any information (i.e., URL data objects) associated with the URL. Should the proxy server 21 not have the URL data object within its cache, it will, in turn, make access over the Internet 22 to the destination server found within the URL in order to place the data object into its cache and then respond to the client 20 URL request. Thereafter, should another client make a request to the proxy server 21, it can be serviced directly from the cache without necessary access over the Internet to the destination server found in the URL itself.

Note that the client 20 can be any software application capable of communicating or directing requests to the proxy server 21 using the HTTP protocol and would include other proxy servers, web browsers, Internet "enabled" applications, etc. Furthermore, HTTP requests contain a variety of information that can be used to "force" the proxy server 21 to access the URL data object over the Internet in order to assure that the "freshest" copy has been accessed. Such operation of proxy servers and their use as caches are generally known in the art for use in servicing HTTP requests.

It should be noted that the term URL may indicate either the address of where a data object is originally located and accessed, or the data object itself. To distinguish, a URL itself would be an address or location of the data object whereas a URL data object would be the actual web page file that is transmitted across the Internet to the client application. Though the appropriate usage is readily identifiable by context, efforts will be made throughout this application to distinguish between the two.

There are benefits of having a proxy server acting as a cache for URL data objects. One benefit is that for cached items, the total access time for a user is generally reduced since the connection between the client 20 and the proxy server 21 is typically over a Local Area Network ("LAN") rather than having to access the data object over the Internet or other Wide Area Network ("WAN"). Another benefit is for security purposes so that an organization may have a "firewall" to protect itself from unwanted outside penetration.

Larger corporations and other organizations may have many proxy servers servicing their needs. It becomes desirable in such situations to harness many proxy servers together as a single, logical distributed cache. Ideally, such a single distributed cache would have no duplication of URL data objects contained therein. Furthermore, a single distributed cache should have as little overhead as possible in servicing any given URL request that arrives at a member of the distributed cache. In other words, the actual URL data object may not be residing at the same server that originally receives the URL request and some form of forwarding, routing, or acquisition of the desired URL data object must occur in order to service that original URL request.

One attempt at creating a such a distributed cache is the Internet Cache Protocol ("ICP") that coordinates the activity of an "array" of proxy servers. Though ICP allows an array of proxy servers to function as a distributed cache, it also has some drawbacks as will be explained hereafter.

Referring now to FIG. 2, the interaction of a client with a proxy server array is shown. In such an arrangement, a client 23 will contact one of the proxy servers in the array 24 in order to access URL data objects that are available over the Internet 25. Typically, a client 23 is assigned to a particular proxy server within the proxy server array 24 and may itself be a proxy server. Since the URL data object requested by a client may exist in a different proxy server than the one contacted, a mechanism or protocol is necessary for routing the URL request from the receiving proxy server to the appropriate proxy server, or in some other way service that URL request.

Referring now to FIG. 3, proxy server array that is organized and configured according to the ICP protocol is shown. In the example shown in FIG. 3, a client 26 will direct HTTP requests to an assigned proxy server 27 that is part of an ICP proxy server array 28. Assuming that a desired URL data object is contained in the distributed cache created by the ICP proxy server array 28 and located at the proxy server 29, a scenario illustrating the operation of ICP is now shown. This scenario will also illustrate a number of problems that make ICP a less than optimal way of creating a distributed cache.

The URL request will originate at the client 26 and be received by the proxy server 27 as indicated by arrow 30. After determining that the desired URL object does not reside at the proxy server 27 in its local cache storage, a query will be sent out to all proxy servers in the ICP proxy server array 28 as indicated by the query messages path 32. In turn, every other proxy server that receives the query will give a response back to the proxy server 27 as indicated by the response message path 34. Each individual response will indicate whether or not the specified URL data object resides at that particular responding proxy server. Note that more than one of the proxy servers in the ICP proxy server array 28 may contain a given URL data object.

For purposes of this example, it is assumed that only the proxy server 29 actually contains the data object and therefore the response from proxy server 29 to proxy server 27 would be the only response having an indication that the desired or requested URL data object exists thereon. Note that for an ICP proxy server array 28 of N proxy servers, that N−1 messages were sent out by the proxy server 27 querying for the existence of the URL data object and N−1 messages were sent back to or received by the proxy server 27 in response, thus creating a fair amount of network message traffic and usage of the overall network bandwidth.

Once the proxy server 27 knows where the desired URL data object is located, it will issue a request to get the object as indicated by the get path 36. Naturally, the proxy server 29 will respond by sending the desired URL data object from the proxy server 29 to the proxy server 27 as indicated by the send object path 38. Now that the proxy server 27 has the desired URL data object, it can respond to the original URL request and return that data object to the client 26.

Cache storage redundancy can be seen since the proxy server 27 will also place the URL data object into its local cache such that the same URL data object now exists in both proxy server 27 and proxy server 29. Also, network usage overhead is significant since the total number of messages to allow the proxy server 27 the ability to service the original URL request for an ICP proxy server array 28 of N proxy servers is 2(N−1)+2 total data messages across the network.

Given the above scenario, a number of undesirable problems exhibit themselves almost immediately. First, by using a query-response scenario to contact all of the proxy servers in the ICP proxy server array, a significant amount of network resources may be consumed. Additionally, a natural consequence of the query-response scenario is that the larger the ICP proxy server array 28 becomes the greater the network overhead for each non-resident URL request, therefore adding a negative scalability component to operating an ICP server array. This means that each addition of another proxy server onto the array will in fact increase the amount of communication between the different proxy servers for all array members and for each request in order to resolve the correct location of a desired URL data object. Theoretically, there may exist an upper limit to the number of proxy servers that may be comfortably used in an ICP proxy server array 28.

Another problem is that multiple copies of the distributed cache URL data objects exist across the various proxy servers. In an extreme case, each proxy server of the ICP proxy server array 28 could become a redundant mirror of the other array members. It would be desirable to have only one copy of a URL data object existing in the entire distributed cache so that the distributed cache may be used to its full capacity.

Finally, adding or deleting proxy servers from the ICP proxy server array 28 may totally disrupt the distribution of URL data objects across the entire logical cache. In an extreme case, the distributed cache may be "emptied" upon any addition or removal of a proxy server from a proxy server array.

What is needed is a truly distributed logical cache across an array of proxy servers where a given URL data object is contained therein at only one location so as to maximize cache capacity. Furthermore, what is needed is a way to access the correct proxy server within the logical distributed cache or array of proxy servers without making a query to each and every proxy server making up the array thereby allowing a request received at one proxy server to be directly routed to the correct proxy server, or alternatively, an acquisition of the desired URL data object from the correct proxy server quickly attained. Finally, what is needed is a way of gracefully migrating cached URL data objects between the different proxy servers as a result of additions or removals of proxy servers from the proxy server array making up the distributed cache that will not require the reorientation of all URL data objects in the cache.

SUMMARY AND OBJECTS OF THE INVENTION

It is an object of the present invention to enable clients with the ability to directly access a proxy server in an array of proxy servers that will contain a desired URL data object based on processing the URL and proxy array membership information and without making expensive query-response transaction with each and every proxy array member.

It is another object of the present invention to utilize deterministic hashing algorithms to allow consistent and predictable identification of a proxy server to be assigned or have residing thereon a particular URL data object.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and system for client-side deterministic routing and URL lookup into a distributed cache of URLs are provided. An enabled client according to the present invention may directly access the correct proxy server in a proxy server array without making expensive query-response transactions or routing the URL data object request through multiple proxy servers.

Each proxy server has access to the entire array membership information stored in array membership list. This array membership list is periodically updated and reflects changes in array membership due to additions, removals, or temporary unavailability of the various proxy servers that make up the array. When changes have propagated through the proxy server array, all array membership lists at each proxy server will contain identical information.

The array membership list is also propagated to or otherwise made available to enabled clients so that array membership information resides at the client itself. Many different mechanisms exist for getting the information to the enabled client as those skilled in the art may appreciate.

When an enabled client generates a URL data object request, it uses the array membership list, the URL itself, and a deterministic hashing function to identify which array member should actually hold the URL data object in its local cache. The request is then serviced by directly accessing the desired data object from the correct proxy server without making expensive query-response transactions over the network or routing the request through multiple proxy servers. The hashing function operates so as to distribute the cached URL data objects evenly over the entire proxy server array without redundancy so as to more efficiently use the array capacity.

The proxy server identification mechanism works by computing a hash value for each server name found in the array membership list and a hash value for the requested URL. The URL hash value is combined with each member proxy server hash value to form a combined value. The proxy server associated with highest of the combined values is identified as where the desired URL should reside in local cache. A load factor that assigns some proxy servers proportionately more URL data objects for the local cache is also incorporated in the creation of the combined hash values.

All information for making a determination as to the correct proxy server is completely available at an enabled client that generates the URL request so that no external information is necessary. Furthermore, because of the propagation of array membership information between the proxy servers, and from there to all enabled clients, the exact same information is used to identify the exact same proxy server regardless of which enabled client generates the URL request.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 9A shows the initial state of the proxy server array having two proxy servers and each Array Membership List ("AML") showing the two active members.

In FIG. 9B, a third proxy server is added to the array and the array membership list for all three proxy servers is updated to include the newly added proxy server.

In FIG. 9C, one proxy server is temporarily unavailable due to mechanical failure or other event and the array membership list of the remaining proxy servers in the array have been marked to indicate that the designated proxy server is temporarily unavailable.

In FIG. 9D, the same proxy server as was unavailable in FIG. 9C is actually removed from the array and the array membership lists from the remaining proxy servers are updated to indicate the removal of the proxy server from the list.

DETAILED DESCRIPTION OF THE PREFERRED EMBODIMENTS

Figure 1:
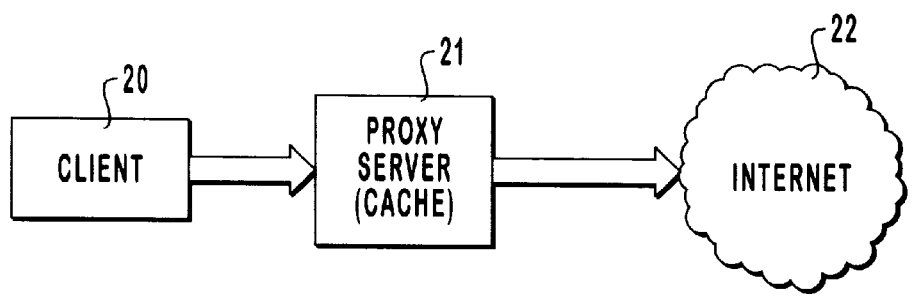
FIG. 1 is a logical diagram showing the use of a proxy server that serves as a cache from which a client may access desired URL data objects.

As used herein, the term "hashing function" refers to those functions known in the art that systematically covert one multi-bit representation into another, usually smaller, single or multi-bit representation. A hashing function is said to be deterministic if it generates the same results from the same input.

As used herein, the term "data object" refers to any data that may be accessed from a distributed store and singularly identified. Examples of data objects would include, but not be limited to, files, data base records, graphic images, programming "objects," etc. One particular data object that will used throughout the application is a URL data object that is any resource that can be identified and accessed using a URL according to the HTTP protocol. Typically, this would be a Hyper Text Markup Language ("HTML") file that is located on a server of the World Wide Web and accessed using a URL. Those skilled in the art will appreciate that the invention as explained using URL data objects accessed over the Internet will apply to many other environments having a distributed store of data objects.

As used herein, the term "array membership information" refers to information regarding all the servers making up an array of servers that can be configured into a distributed cache. As used more particularly throughout with one embodiment of the present invention, this would be information regarding proxy servers in a proxy server array that is used to cache URL data objects. Note that such array membership information may be incorporated into a file or data structure that may be shared or updated between the different array members, such as an array membership list. Array membership information would necessarily include some form of identification of each array member that can be used to access that member, such as server name or IP address. Additionally, array membership may include but not need not be limited to the following: a capacity for a particular server, a load factor that indicates a relative amount of load the server can handle as compared with other members of the array, and any information regarding server characteristics, such as CPU power, physical location, administrator's name, etc.

Unless specified, a URL request may refer to an original request or a forwarded request. The term "generating" when referring to a URL request or other data object access s request could be an original request or a forwarded request received by a server and simply passed on to another server.

As used herein, the term "distributed logical cache" or "distributed cache" refers to the cache as a whole over the entire proxy server array while "local cache" will refer to the data stored at a particular proxy server.

As used herein, the term "URL" will be used to designate both a URL data object as well as a URL in the sense of the identifying title of the URL data object that indicates the location and object name that would be included in an HTTP request for a URL data object (also known as a URL request). An HTTP response would include the actual URL data object (also known as a URL response).

As commonly used throughout, a URL data object is always accessed from the proxy server cache, even if not there initially. Any request received that is not in the cache will be placed therein after the proxy server gets it from the destination server over the Internet. Therefore, a cache is logically viewed for purposes of this application as containing all possible URL data objects that may be desired and when speaking of requesting an object from the distributed cache, the object is presumed to be in the cache.

It may be noted that the concepts of a proxy server acting as a store or cache for URL data objects may be applied to many different applications. For example, a distributed store of data files over a network could be achieved by having a proxy server servicing clients directly with cached copies of ordinary files that are located elsewhere in a corporation's network server structure. Those skilled in the art will see the natural application of the concepts involving proxy servers for accessing Internet information to other information access scenarios.

A "storage means," or "storage system" is defined broadly to incorporate any type of device interfacable with a CPU that is used to memorize information and includes both long-term and short-term storage. Thus, storage means would include, though not be limited to, cache memory, RAM, disk storage, tape storage, etc. Furthermore, storage means contemplates the entire system of storage incorporated by a computer in combination so that the RAM, cache, and disk drive together could be considered a storage means or storage system. A storage means can also be logically partitioned into different locations so that items are stored in different media or on different parts of the same media. For example, a storage means comprising RAM and disk storage could be logically partitioned so that item A is stored in a portion of RAM (first partition or location), item B is stored in another portion of RAM (second partition or location), and item C is stored on disk (third partition or location).

Figure 4:
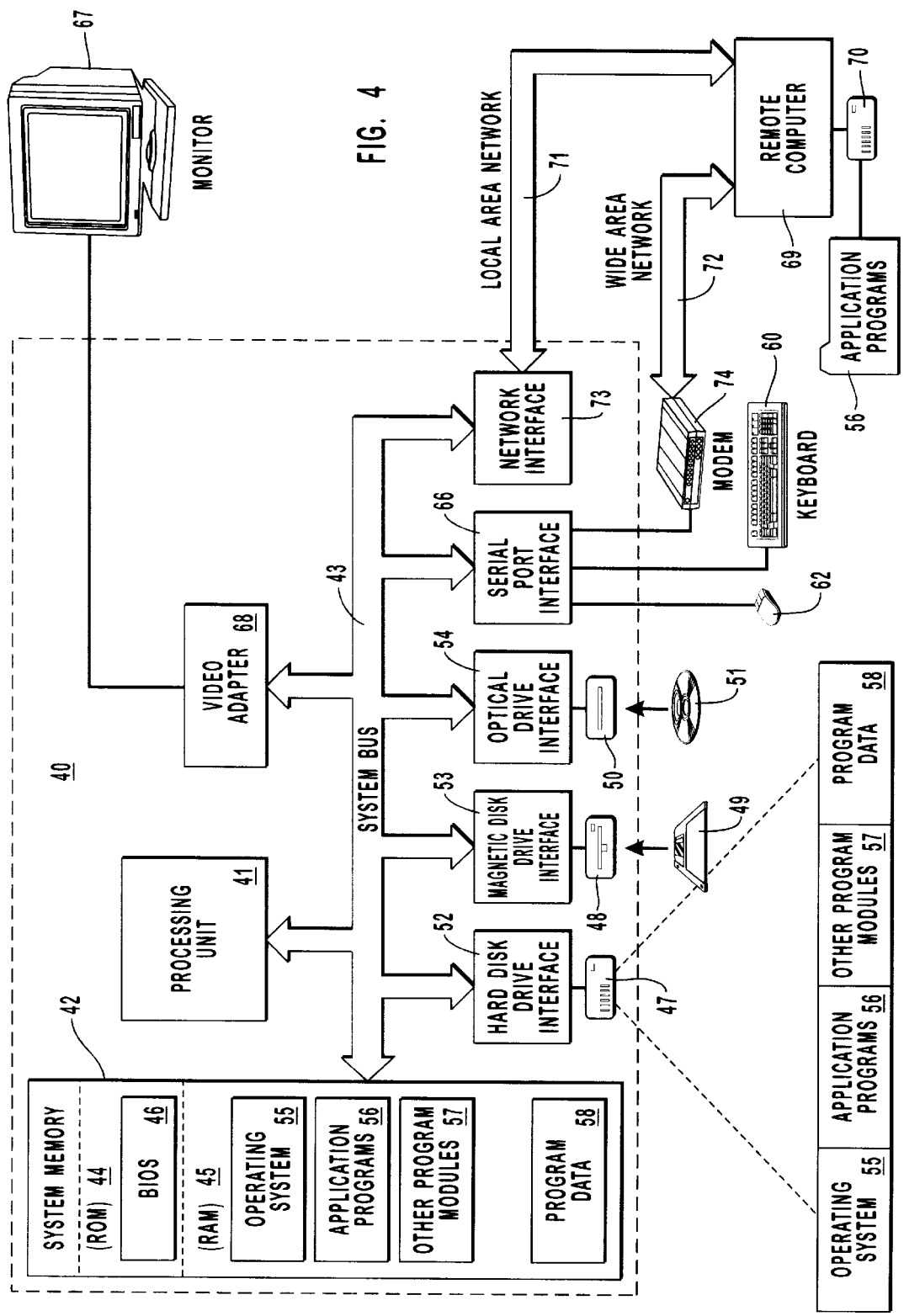
FIG. 4 is a block diagram of an exemplary system for implementing the present invention that includes a general purpose computing device in the form of a conventional personal computer.

FIG. 4 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 4, an exemplary system for implementing the invention includes a general purpose computing device in the form of a conventional personal computer 40, including a processing unit 41, a system memory 42, and a system bus 43 that couples various system components including the system memory to the processing unit 41. The system bus 43 may be any of several types of bus structures including a memory bus or memory controller, a peripheral bus, and a local bus using any of a variety of bus architectures. The system memory includes read only memory (ROM) 44 and random access memory (RAM) 45. A basic input/output system 46 (BIOS), containing the basic routines that helps to transfer information between elements within the personal computer 40, such as during start-up, is stored in ROM 44. The personal computer 40 further includes a hard disk drive 47 for reading from and writing to a hard disk, not shown, a magnetic disk drive 48 for reading from or writing to a removable magnetic disk 49, and an optical disk drive 50 for reading from or writing to removable optical disk 51 such as a CD ROM or other optical media. The hard disk drive 47, magnetic disk drive 48, and optical disk drive 50 are connected to the system bus 43 by a hard disk drive interface 52, a magnetic disk drive-interface 53, and an optical drive interface 54, respectively. The drives and their associated computer-readable media provide nonvolatile storage of computer readable instructions, data structures, program modules and other data for the personal computer 40. Although the exemplary environment described herein employs a hard disk, a removable magnetic disk 49 and a removable optical disk 51, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 49, optical disk 51, ROM 44 or RAM 45, including an operating system 55, one or more application programs 56, other program modules 57, and program data 58. A user may enter commands and information into the personal computer 40 through input devices such as a keyboard 60 and pointing device 62. Other input devices (not shown) may include a microphone, joystick, game pad, satellite dish, scanner, or the like. These and other input devices are often connected to the processing unit 41 through a serial port interface 66 that is coupled to the system bus, but may be connected by other interfaces, such as a parallel port, game port or a universal serial bus (USB). A monitor 67 or other type of display device is also connected to the system bus 43 via an interface, such as a video adapter 68. In addition to the monitor, personal computers typically include other peripheral output devices (not shown), such as speakers and printers.

Figure 2:
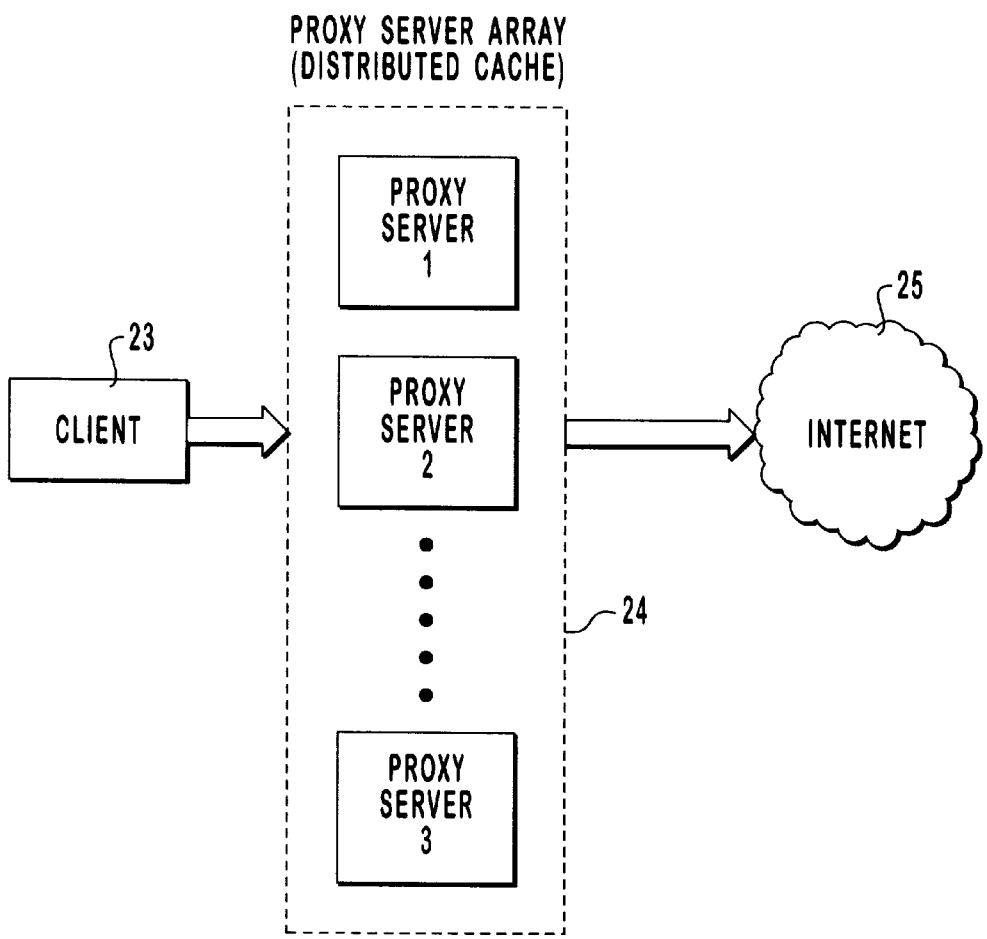
FIG. 2 is a logical diagram illustrating how an array of proxy servers may be logically configured to be a single distributed cache having a greater capacity.
Figure 3:
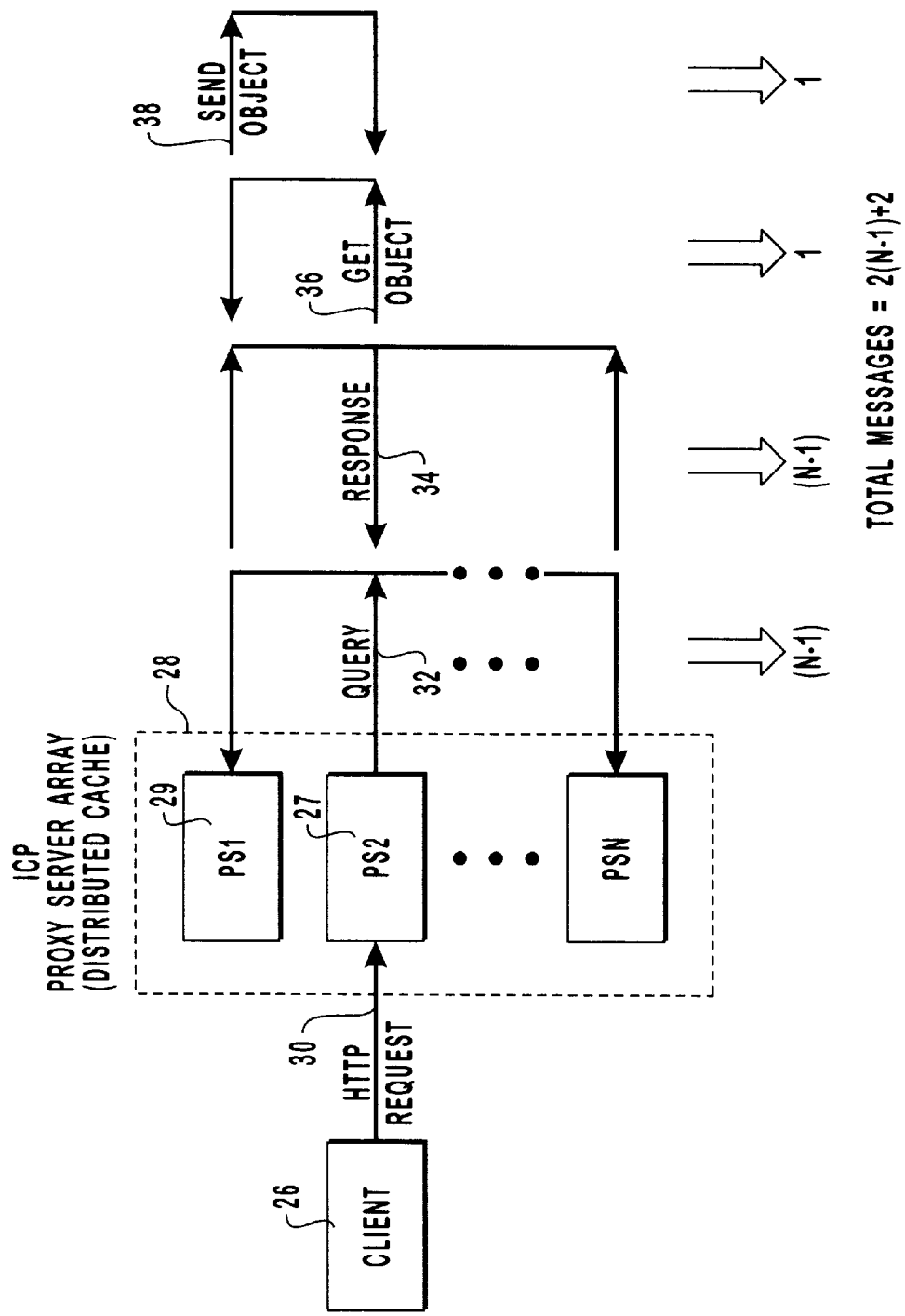
FIG. 3 is a logical diagram showing an array of proxy servers that coordinate using the Internet cache protocol or ICP with an illustration of how a request directed into the cache at one proxy server may query all other proxy servers in the cache and eventually receive the data object laterally from another proxy server in order to service the original request.

The personal computer 40 may operate in a networked environment using logical connections to one or more remote computers, such as a remote computer 69. The remote computer 69 may be another personal computer, a server, a router, a network PC, a peer device or other common network node, and typically includes many or all of the elements described above relative to the personal computer 40, although only a memory storage device 70 has been illustrated in FIG. 2. The logical connections depicted in FIG. 2 include a local area network (LAN) 71 and a wide area network (WAN) 72. Such networking environments are commonplace in offices enterprise-wide computer networks, intranets and the Internet.

When used in a LAN networking environment, the personal computer 40 is connected to the local network 71 through a network or adapter 73. When used in a WAN networking environment, the personal computer 40 typically includes a modem 74 or other means for establishing communications over the wide area network 72, such as the Internet. The modem 74, which may be internal or external, is connected to the system bus 43 via the serial port interface 66. In a networked environment, program modules depicted relative to the personal computer 40, or portions thereof, may be stored in the remote memory storage device. It will be appreciated that the network connections shown are exemplary and other means of establishing a communications link between the computers may be used.

Figure 5:
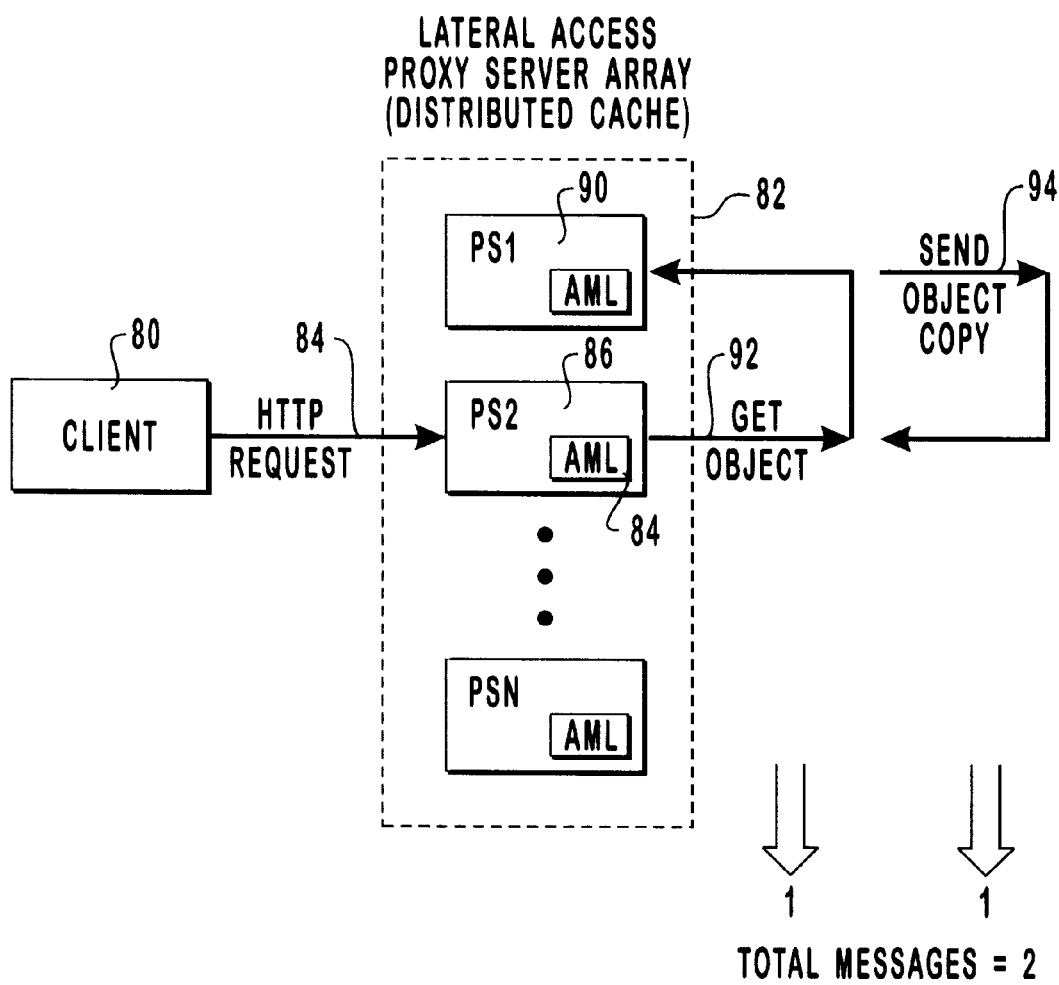
FIG. 5 is a logical diagram showing the operation of a proxy server array configured to form a distributed cache where requests are serviced according to the present invention and an example is given where a request received by one proxy server of the array may laterally access the proxy server having the desired URL data object without making queries to all proxy servers in the array.

Referring now to FIG. 5, a logical diagram showing a proxy server array according to the present invention that allows lateral access of a URL data object without querying all proxy servers in the array as would occur using ICP is shown. A client 80 will access a proxy server array 82 configured to a distributed cache with an original HTTP request 84 directed to proxy server 86. The proxy server 86 has an array membership list 84 that contains all the proxy servers that make up the proxy server array 82.

Based on the information in the array membership list 84 and the HTTP request containing the URL for the URL data object, the proxy server 86 will determine which proxy server in the proxy server array 82 should contain the desired URL data object. One way that this can be done, and which will be shown in more detail hereafter, is by using a deterministic hashing function to hash the URL received in the HTTP request 84 and combining it with a deterministic hash of each server name in the array membership list 84 in order to generate a rank ordering of each server in the array membership list 84 based on combined hash value. Typically, the combining of the URL hash value and the array membership list server hash values is itself another deterministic hash. Furthermore, once the proxy servers found in the array membership list 84 are rank ordered, the proxy server with the highest combined hash value or score is chosen for locally caching the URL data object. The deterministic hashing algorithms used will calculate hash values such that URL data objects are evenly distributed over the proxy servers making up the array. Again, choosing the correct proxy server within the proxy server array 82 that will contain the desired URL data object in the local cache will be explained in greater detail hereafter.

Once the correct proxy server is determined, proxy server 86 will direct a get object request to proxy server 90 as shown by a get object message 92. Proxy server 90 will respond by sending a copy of the URL data object back to proxy server 86 as indicated by the send object message 94. At this point, proxy server 86 may respond to the original HTTP request 84 thereby allowing the client 80 to have the requested URL data object.

It is important to note that regardless of which proxy server in the proxy server array 82 receives the original URL request, for a particular URL, the same proxy server will be indicated as having the URL data object in its local cache. This results from using deterministic hashing algorithms on exactly the same information since every proxy server in the proxy server array 82 will have an array membership list. This is one way to determine the correct proxy server within a proxy server array that will have a desired URL object without making queries between the proxy servers.

Only two messages are used to allow the proxy server 86 the ability to service the original URL request 84. Such a proxy server array 82 does not exhibit the same negative scaleability problems associated with an ICP proxy server array since there is no need to have a query-response transaction between the proxy server receiving the original URL request and each and every other proxy server in the array. In fact, there is a positive scaleability since as more servers are added to the proxy server array 82, the greater the capacity for the distributed cache.

An additional benefit of a proxy server array as shown in FIG. 5 over an ICP array is that the capacity of the distributed cache is used more effectively with fewer duplicate URL data objects stored at different local caches within the entire distributed cache. This occurs since the deterministic hashing mechanism determines one designated proxy server for each URL.

Figure 6:
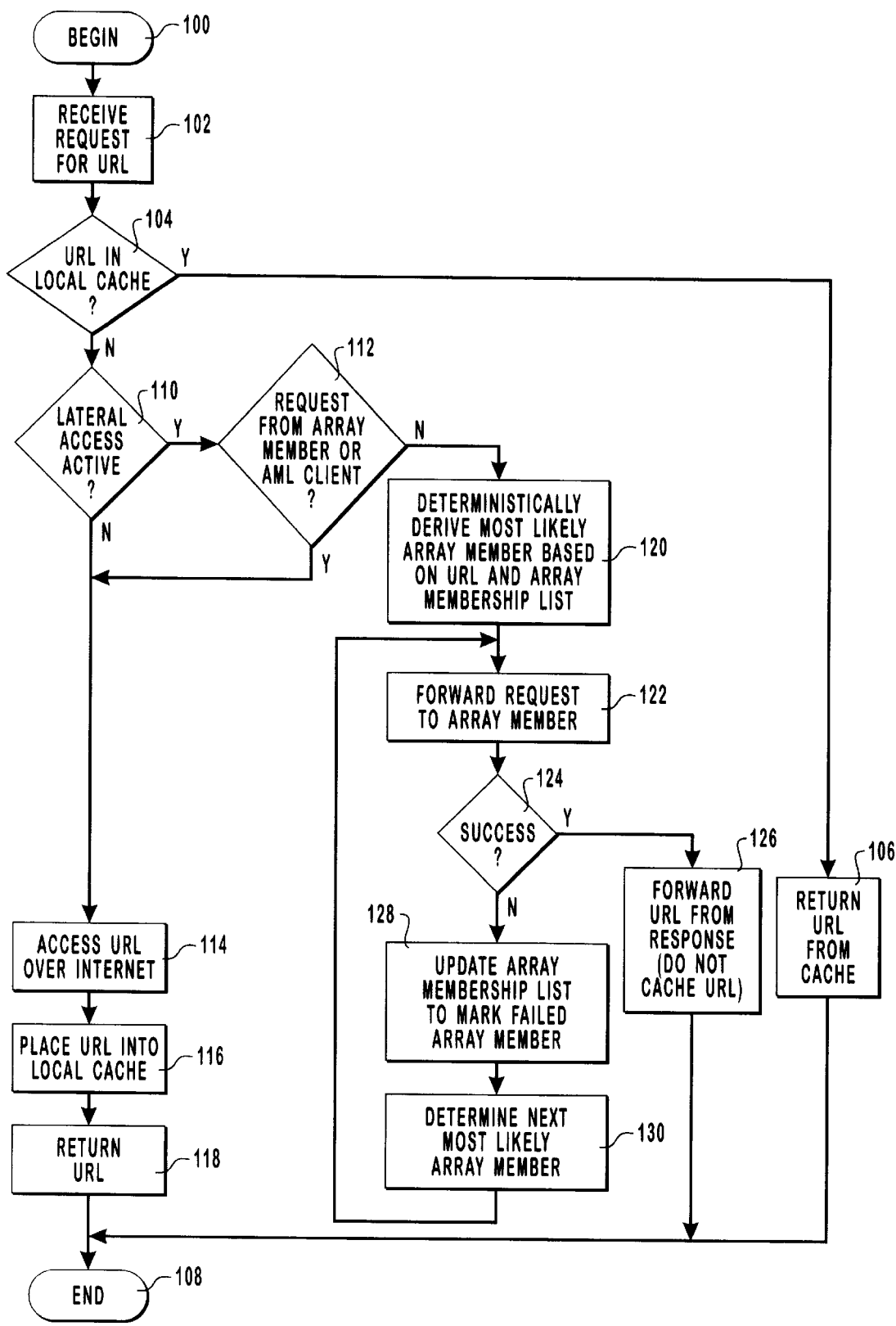
FIG. 6 is a flow chart showing the processing steps taken by a proxy server according to the present invention when receiving a URL data object request.

Referring now to FIG. 6, a flow chart showing the processing steps taken by a proxy server found in the proxy server array 82 as shown in FIG. 5 illustrates the processing steps taken upon receiving a URL data object request. After beginning at step 100, a proxy server, such as proxy server 86 in the proxy server array 82 of FIG. 5, will receive a request for a particular URL data object at step 102.

An initial check is made to determine whether or not the URL is in the local cache at step 104. If the URL data object is in the local cache, the response to the originally received URL data object request will be serviced by returning the URL from the local cache at step 106 before processing ends at step 108. Naturally, taking the path of having the URL in local cache would be the quickest way to service a URL request.

As will be shown in greater detail hereafter, an "enabled" client having the array membership information could do the computations at the client for determining the correct proxy server for a particular URL data object. Therefore, the original URL data object request can be made directly to the proxy server most likely to have the desired URL data object.

Should the URL data object of the received request not be located in local cache as determined at step 104, a check is made at step 110 to determine whether lateral access is currently active for the proxy server array 82. If lateral access is not active, then the proxy server may operate as a single proxy server rather than as in a distributed cache or array member. Alternatively, if all clients to the proxy server array are "enabled" clients, meaning that they have the ability to directly access the designated proxy server for a particular URL data object, then it can be assured that the designated proxy server is the correct recipient of the URL data object request.

At step 114, the proxy server would access the URL data object over the Internet and receive a copy at the proxy server, followed by placing the URL data object into the local cache at step 116, and finally returning the URL data object to the client at step 118 as part of a response to the original URL data object request. Specific mention is made at step 114 of accessing the URL data object over the Internet for simplicity sake since proxy server arrays may be clients to other proxy server arrays. Eventually, however, the URL data object request will be finally resolved through the Internet if no intervening proxy servers or proxy server arrays contain the object locally. Finally, processing would end at step 108 until another URL data object request is received by the proxy server.

If lateral access is active as determined at step 110, indicating that the proxy server is operating as part of a distributed cache in a proxy server array such as that shown in FIG. 5, the request is analyzed to determine whether it was made from another member of the proxy server array or an "enabled" client having access to the array membership list and thus able to directly access the proxy server within a proxy server array that is most likely to contain the desired URL data object in its local cache. If so, then the proxy server receiving the request is the correct proxy server but simply does not have the desired URL data object in the local cache as previously determined at step 104. In such a case, the desired URL data object must be accessed over the Internet at step 114 and placed in to the local cache at step 116. At that point, the URL data object may be returned at step 118 to the client in an appropriate response before processing ends at step 108.

If the request was not from another proxy server that was part of the same proxy server array or a client that had an array membership list and thus could make direct accesses as determined at step 112, then the correct array member proxy server must be determined at step 120. In other words, at step 120, a deterministic way must be used to process available information in order to avoid the detrimental query-response scenario carried out by ICP. The array membership information as found in the array membership list and the URL as found in the URL data object request are deterministically processed so that a proxy server that should have the URL data object contained therein as part of the local cache can be ascertained.

While those skilled in the art may determine a variety of ways to deterministically arrive at a single proxy member that can be consistently calculated regardless of which proxy member is making the calculation, the discussion that follows presents one such way that works very effectively. Note that the only real requirements for step 120 are that deterministic results are calculated when given the same starting information, such as the URL name and the different servers that make up the proxy server array, and that queries need not be sent out to all array members. While the present embodiment has an array membership list that is available at each proxy server that makes up the array, other embodiments may get or have the array membership information differently than this embodiment yet still accomplish the purposes as explained.

Hashing algorithms can be used to deterministically categorize both the array members and the URL itself. The present method comprises the following steps: (1) the array membership list is analyzed and hash values are computed on each of the proxy names found therein, (2) the URL name that is used to access the URL data object is run through a hashing algorithm and a hash value computed thereon, and (3) the two hashes are then combined taking into account a load factor that is assigned to each proxy server. The combined hash values will then give a numerical value for each proxy server that is unique for the URL sought, such that the correct proxy server is chosen by taking the highest "score" or hash value with the corresponding proxy server being selected as the most likely proxy server to contain the URL data object in its local cache.

The hashing algorithm used is statistically designed so that URL data objects are assigned equally over N proxy servers in the proxy server array. When a proxy server hash value is combined with a URL hash value, relative load factors can be taken into account so that proxy servers with enhanced capacity will be assigned a proportionately greater amount of the URL data objects.

When changes are made to the proxy server array membership, the URL data object assignments among the array members may also change. A URL data assignment is where a particular URL data object would reside if requested from the proxy server array. In other words, every possible URL data object will have an "assignment" to a particular proxy server in an array by operation of the deterministic hashing algorithm.

The assignment changes are automatically manifest by the operation of the hashing algorithm since all the proxy server making up the array will be used as input. Therefore, if an addition or deletion occurs, the algorithm will function differently, though still deterministically. For example, if an array is increased by one proxy server, each of the original proxy servers will be assigned fewer of all possible URL data objects to store in their local cache due to the addition of the new proxy server. In like manner, if a proxy server is removed from the array, each remaining proxy server will be assigned additional potential URL data objects from among all possible data objects to store in their respective local caches.

The assignment changes for the universe of URL data objects implies that, besides changes in routing of newly requested URL data objects, some actual URL data objects in one proxy server cache will be moved or migrated to another proxy server as a result of an addition or removal of a proxy server from the array. Due to an array membership change, the same request that would previously indicate one particular proxy server will now indicate another proxy server as having the desired URL data object in the respective local cache. The URL data object would eventually be flushed from the first proxy server since no requests would be directed thereto due to the deterministic algorithm, while the new proxy server would receive the requests previously sent to the first proxy server. In this sense, the URL data object has "migrated" from one proxy server to another.

When speaking of URL data object migration throughout this application, it entails both the change in assignment for a given hypothetical URL data object that may be requested from amongst all possible URL data objects as well as actual URL data objects that shift between different proxy server local caches over time.

The deterministic algorithms used to make an "assignment" or route a URL data object request are designed so that only the minimum of URL data objects are switched between the proxy server in an array. For an array of N members, the addition of a proxy server will migrate 1/(N+1) of the total URL data objects taken equally from the original N proxy servers to the newly added proxy server while the rest will remain unchanged. In like manner, the removal of a proxy server will cause the 1/N of the total URL data objects to migrate equally among the remaining N−1 proxy servers.

Below is a more detailed example of how the determination is made at step 120. Initially, the names of all the proxy servers in the array are taken and hash values computed for each, followed by the computation of a hash value of '19' for URL #1, and finally, a combined hash value for each proxy server as shown below in Table 1. Note that, if the proxy servers are ordered from highest to lowest combined hash value and the selection criteria for the designated proxy server is choosing the highest "score" or combined hash value, the proxy server "SweetHeart" is identified or chosen to cache the data object associated with URL #1 in its local cache.

TABLE 1

|  |  | URL #1 |
| --- | --- | --- |
| Proxy Server Name | Hash Value | 19 |
| PearBlossom | 13 | 5 |
| SweetHeart | 8 | 9 |
| Honey | 5 | 7 |
| Kitten | 28 | 4 |

Below, in Table 2, scores are generated for URL #2, URL #3, and URL #4. Note that the "winning" scores highlighted below for the all the URLs indicate a natural load balancing with one URL data object being stored or assigned to each of the respective proxy servers.

TABLE 2

|  |  | URL #1 | URL #2 | URL #3 | URL #4 |
| --- | --- | --- | --- | --- | --- |
| Proxy Server Name | Hash Value | 19 | 14 | 5 | 2 |
| PearBlossom | 13 | 5 | 6 | 10 | 4 |
| SweetHeart | 8 | 9 | 2 | 7 | 5 |
| Honey | 5 | 7 | 4 | 3 | 10 |
| Kitten | 28 | 4 | 7 | 8 | 1 |

The effect of adding an additional proxy server can be seen below in Table 3. A new proxy server named "Heidelburg" has been added to the proxy server array with its own combined hash values for each URL. Since the combined hash value for the proxy server named "Heidelburg" and URL #2 is the highest score, the data object associated with URL #2 will migrate from the proxy server named "Honey" to the proxy server named "Heidelburg."

TABLE 3

|  |  | URL #1 | URL #2 | URL #3 | URL #4 |
| --- | --- | --- | --- | --- | --- |
| Proxy Server Name | Hash Value | 19 | 14 | 5 | 2 |
| PearBlossom | 13 | 5 | 6 | 10 | 4 |
| SweetHeart | 8 | 9 | 2 | 7 | 5 |
| Honey | 5 | 7 | 4 | 3 | 10 |
| Kitten | 28 | 4 | 7 | 8 | 1 |
| Heidelburg | 14 | 2 | 9 | 4 | 6 |

While those skilled in the art will appreciate that many different ways may be devised to generate the hash values used in the previous tables as long as they are deterministic in nature. One form of deterministic hash algorithms used to create hash values for the proxy servers making up an array, the URL, and the combined hash values is explained below.

Because irreversibility and strong cryptographic features are unnecessary for this application, a very simple and fast hash function based on the bitwise left rotate operator is used on each textual character making up the URL. For each character in the URL or the proxy server name, one of the following respective functions is performed to arrive at the URL hash value:

URL_Hash_Value+=_rotl(URL_Hash_Value, 19)+ <character_value>

Proxy_Server Hash_Value+=rotl(Proxy_Server_ Hash_Value, 19)+<character_value>

Additionally, the following steps are taken on the proxy server hash value in order to further spread the values across the hash space since proxy server names may be similar to each other:

Proxy_Server_Hash_Value+=Proxy_Server_Hash_ Value *0x62531965

Proxy_Server_Hash_Value+=rotl(Proxy_Server_ Hash_Value, 21)

The combined hash value is created by using the exclusive-OR function on the URL hash value and the proxy server hash value, multiplying by a constant, and performing a bitwise rotation according to the following formulas:

Combined_Hash_Value=(URL_Hash_Value◊Proxy_ Server_Hash_Value)

Combined_Hash_Value+=Combined_Hash_Value*
0x62531965
Combined_Hash_Value=rotl(Combined_Hash_Value, 21)

While these particular hashing functions can be used, those skilled in the art may develop many others that will work within the framework of the present invention. A load factor value associated with each proxy server may also be applied to each combined hash value in order to create a higher score for those proxy servers that have more capacity than others in a proxy server array.

Once the proxy servers have been ordered by means of the combined hash and a "winning" proxy server selected, the URL data object request is forwarded to the highest non-failed array member at step 122. A test is made at step 124 to determine whether forwarded request was successful, and if so, then the desired URL will be contained in the response to the forwarded request. That URL data object can then be returned in response to the original URL data object request made to the server at step 126.

Since this is a lateral access for the URL data object, it will not be placed in the local cache. This is because it already exists in the local cache of the proxy server that was successfully accessed and to place it in this proxy server's cache would create duplicate URL data objects in the overall distributed cache, thereby decreasing overall cache efficiency and capacity. At this point, processing would end at step 108 since the original URL data object request had been serviced.

If the forwarded request was unsuccessful as determined at step 124, meaning that a timeout occurred and no response was received, then the array membership list is updated at step 128 to indicate a particular proxy server has failed and is temporarily unavailable. This is likely to occur when a proxy server is taken off line due to mechanical failure, system maintenance, or other reason rendering it temporarily unavailable to service HTTP requests.

At step 130, the next most likely array member is determined by taking the highest score of the proxy servers in the array that have not been marked as temporarily unavailable (e.g. failed a request). Once the next proxy server is determined step 130, processing loops back to forwarding the request to that array member at step 122, and subsequent processing will be as explained previously.

Figure 7:
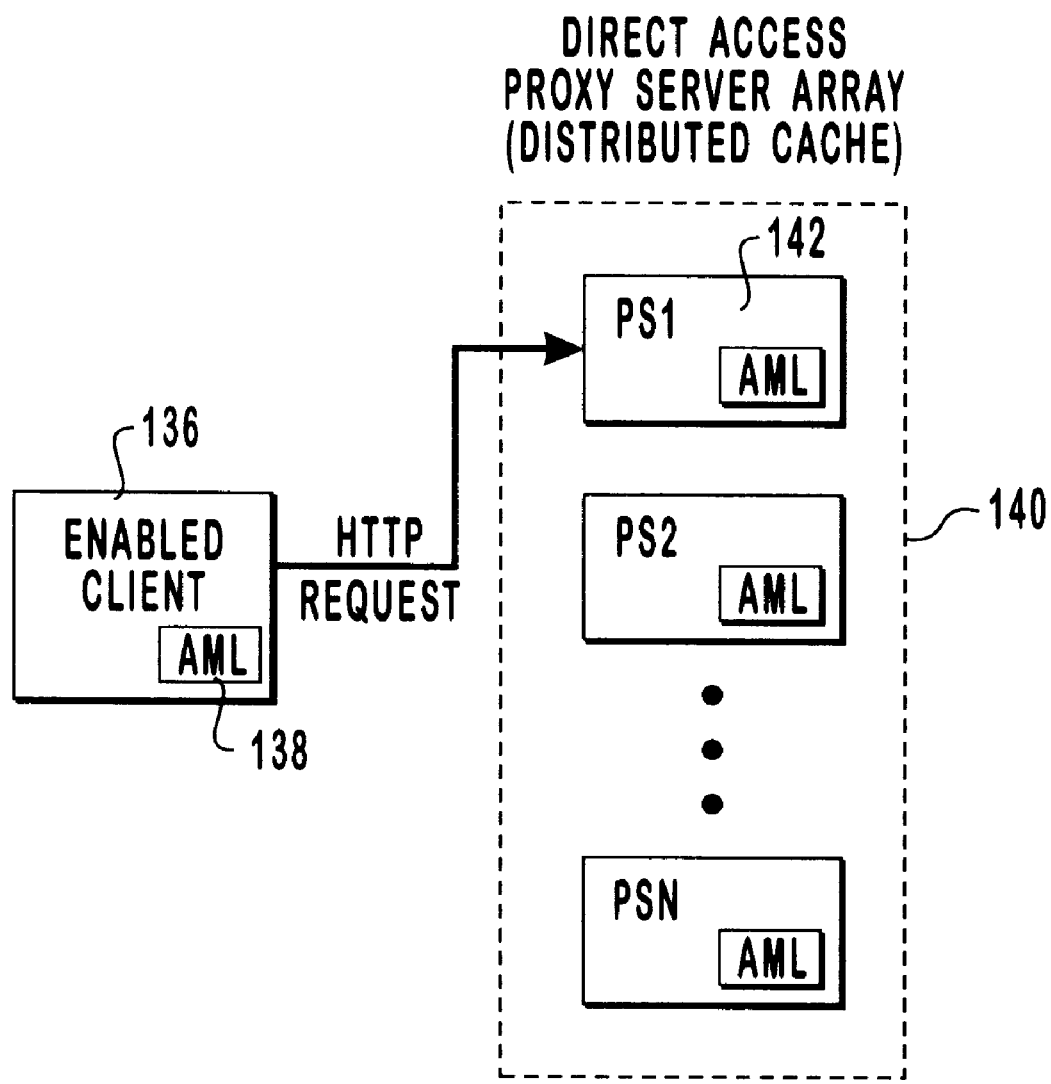
FIG. 7 is a logical diagram showing an array of proxy servers configured to form a distributed cache according to the present invention and an enabled client according to the present invention wherein the client may make the original URL data object request directly to the proxy server within the array that is most likely to contain the desired URL data object.

Referring now to FIG. 7, an enabled client 136 will use its own generated URL request in combination with the array membership list 138 in order to direct the original HTTP URL data object request into the proxy server array 140 directly to the proxy server 142 that is likely to have the desired URL data object in its local cache. The URL generated by the enabled client 136 may originate at the client in response to a user request or other stimulus or enabled client 136 may have received the URL data object request from elsewhere and may be simply forwarding such request. In any case, the term, "generated" refers to having a URL data object request prepared so that it may be sent out to the proxy server array 140. Note that an enabled client may be a proxy server that is part of a proxy server array and that the terms client and server are used to indicate relationships between computer systems. In other words, the same computer system may be a client or server depending on context.

By processing the information from the URL data object request and the array membership list 138, the enabled client 136 is able to directly access the correct proxy server 142 within the proxy server array 140. The determination of the correct proxy server, such as proxy server 142, can be done in the same manner as explained previously in connection for a lateral access within a proxy server array. This is accomplished by making the array membership list available to the enabled client 136, and using the hashing algorithm that are used with the proxy servers within the array as explained previously in connection with step 120 of FIG. 6.

This provides even more efficient service to an enabled client since there are no messages traded between the proxy servers making up the proxy server array 140. By combining the lateral access as shown in the logical diagram of FIG. 5 and the flow chart of FIG. 6, with the direct access logical model shown in FIG. 7 and explained in connection with the flow chart of FIG. 8, both enabled clients such as enabled client 136 of FIG. 7, and legacy or existing clients such as client 80 of FIG. 5, can coexist in the same environment. This sort of arrangement will be explained in more detail hereafter in the discussion surrounding FIG. 13. By combining direct access by enabled clients and lateral access amongst array members, a proxy server array may provide backwards compatibility while allowing greater flexibility for more intelligent or enabled clients.

Figure 8:
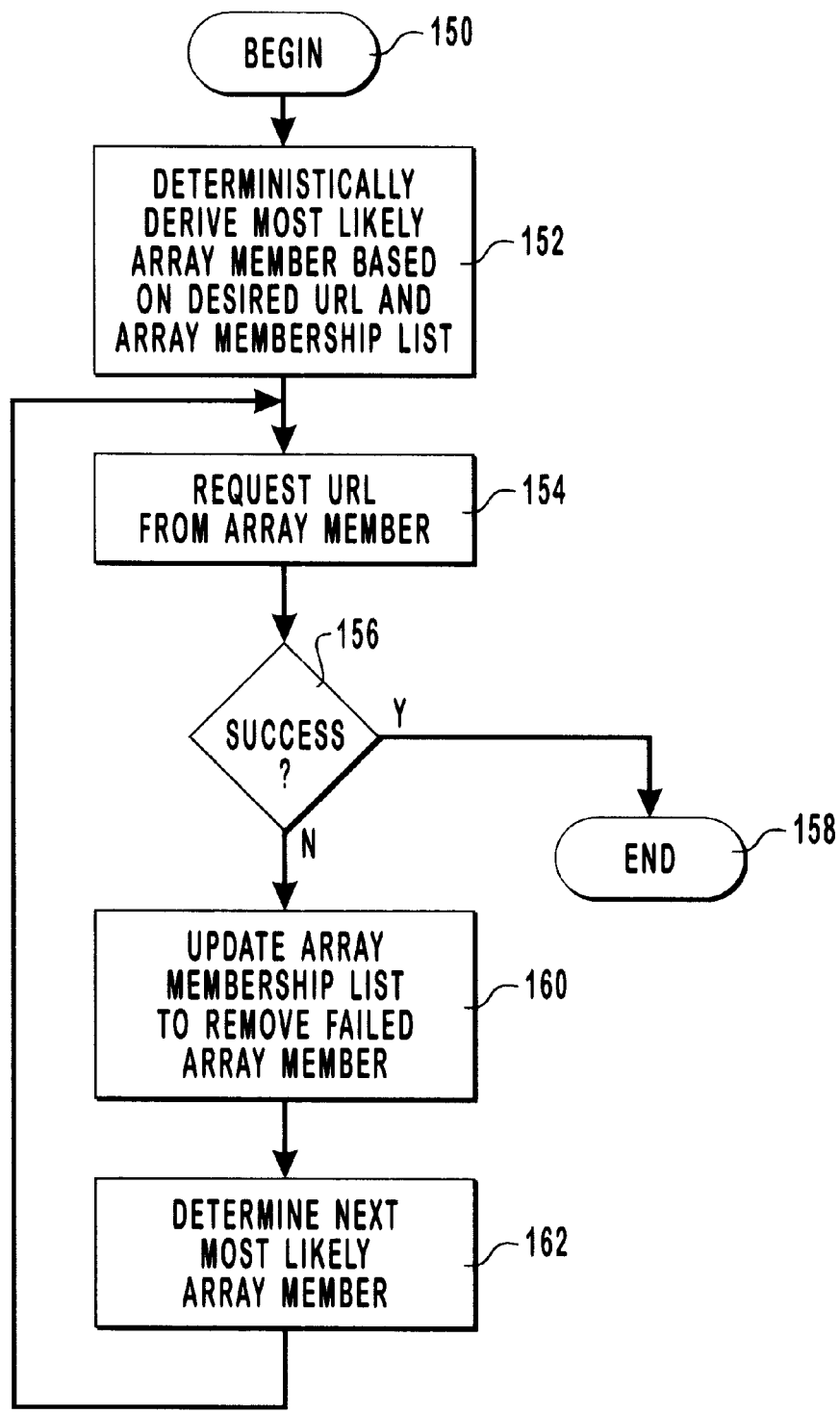
FIG. 8 is a flow chart showing the processing steps taken by an enabled client for directly assessing the proxy server in a proxy server array that is most likely to contain the desired URL data object.

Referring now to FIG. 8, a flow chart showing the processing steps taken by an enabled client, such as enabled client 136 of FIG. 7, in order to directly access the correct proxy server containing the desired URL data object in a proxy server array is shown. After beginning at step 150, a URL request is generated in some fashion as explained previously. At step 152, the enabled client will deterministically derive the most likely array member based on the generated URL and the array membership list containing array membership information. One preferred way of doing this has been explained previously in connection with a proxy server in the discussion of step 120 of the flow chart shown in FIG. 6. The same processing would occur in the same preferred fashion for an enabled client and the details will not be repeated here.

Once the most likely array member has been determined, the URL data object is requested from that array member at step 154. Should the array member return the desired URL data object as determined at step 156, processing will end at step 158 since the client has received the desired URL data object.

Should there be a timeout or other problem such that success was not achieved at step 156, the array membership list will be updated to temporarily mark the failed array member as unavailable at step 160. As explained previously, this may occur due to any reason the array member is temporarily not available and it is expected eventually to return on-line.

At step 162, the next most likely array member is determined. Again, this is done by taking the proxy server having the highest combined hash value that has not been marked as unavailable. Once the proxy server is determined at step 162, processing loops around so that the enabled client may request the URL data object from the newly determined array member at step 154. Again, processing will continue as explained previously.

Figure 9:
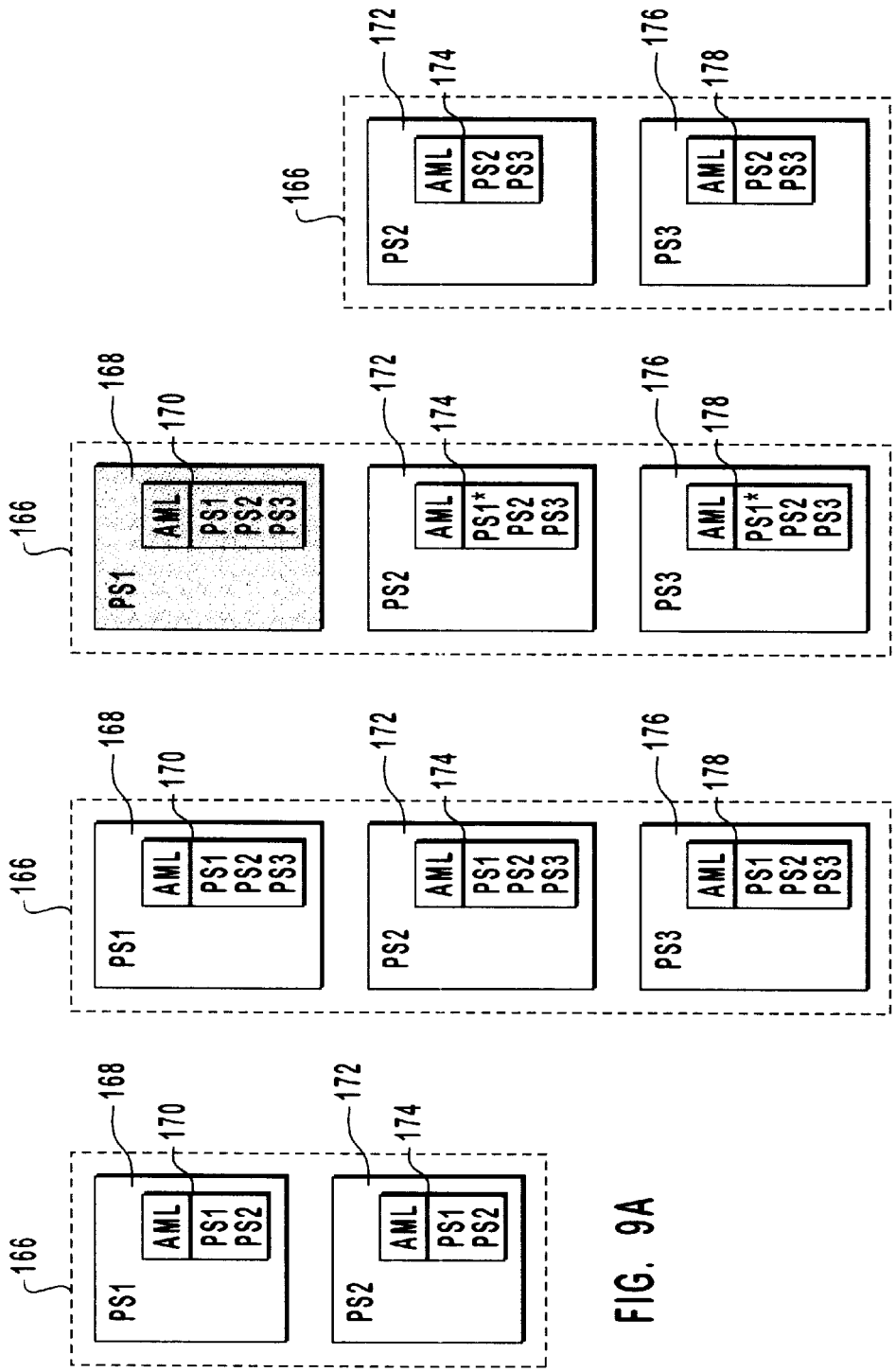
FIGS. 9A–9D show a logical sequence of events that may occur in the life of a proxy server array according to the present invention.

Referring now to FIGS. 9A through 9D, a single proxy server array is shown that undergoes a number of different changes due to the addition, removal, or temporary unavailability of a proxy server in the array. Initially, the proxy server array 166 exists as shown in FIG. 9A with a first proxy server 168 having an array membership list 170 and a second proxy server 172 having an array membership list 174. The array membership lists 170 and 174 contain relevant array membership information including a reference to each and every other proxy server found within the array as shown in FIG. 9A. Note that such reference may be by title, such as ASCII text location and name of the proxy server, by machine readable designation of the proxy server, such as an IP address, or any other means that allows a proxy server to be uniquely identified.

Figure 10:
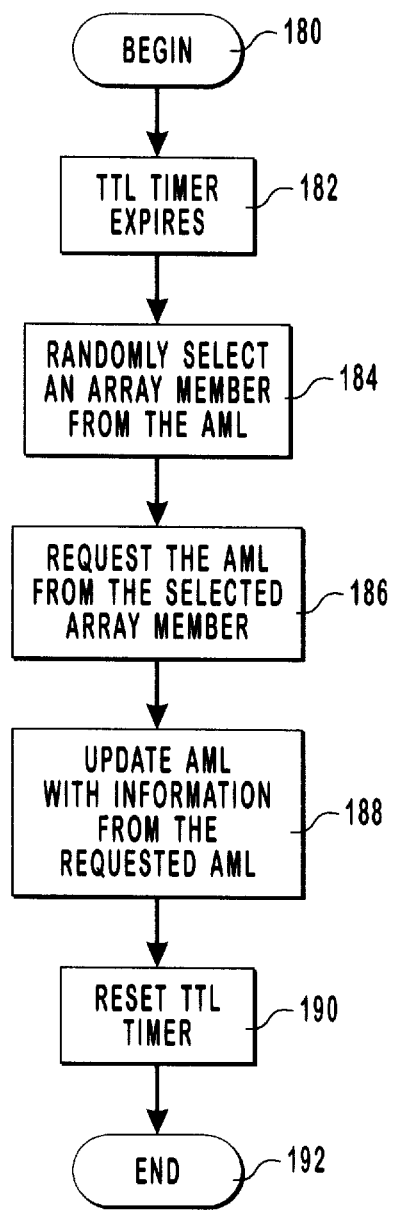
FIG. 10 is a flow chart showing the processing steps taken by a proxy server or enabled client for randomly accessing an array membership list from another member of the proxy server array that represents one form of communicating array membership information between the different proxy servers and enabled clients.
Figure 11:
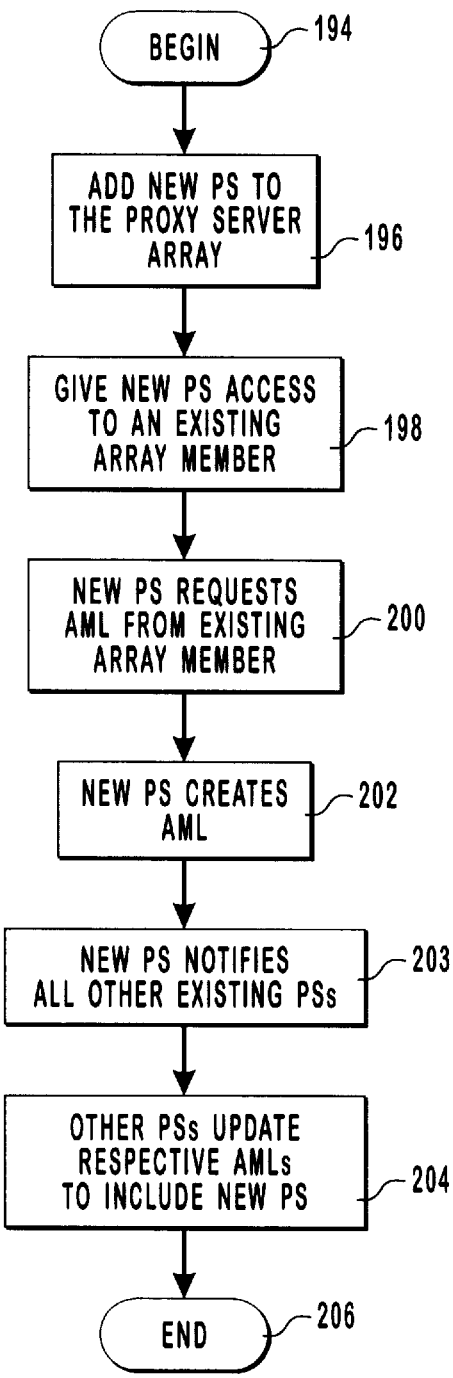
FIG. 11 is a flow chart showing the steps taken in order to add a new proxy server to the proxy server array.

In FIG. 9B, a third proxy server 176 with an array membership list 178 has been added to the proxy server array 166 according to the steps shown in FIG. 11 as will be shown in more detail hereafter. Once the third proxy server 176 has been added to the proxy server array 166, array membership information will be communicated between first proxy server 168, second proxy server 172, and third proxy server 176 such that the corresponding array membership lists reflect the addition of the third proxy server 176 as will be explained later in connection with the steps shown in the flow chart of FIG. 10.

Referring now to FIG. 9C, situation that occurs when a proxy server is temporarily unavailable is shown. Namely, the first proxy server 168 is shaded to indicate its temporary unavailability due to maintenance, malfunction, or other such event. Furthermore, the array membership lists 174 and 178 of the respective second proxy server 172 and third proxy server 176 have the reference to the first proxy server 168 "marked" in some fashion to indicate its unavailability.

The marking of a proxy server as temporarily unavailable occurs during routing of the URL data object request as part of a lateral access amongst proxy server in the array as explained in connection with the discussion of steps 124 and 128 of flow chart in FIG. 6 or as part of an enabled client's direct access into the array as explained in connection with steps 156 and 160 of the flow chart shown in FIG. 8. As soon as the first proxy server 168 again becomes available, knowledge of its availability will be made known throughout the proxy server array 166 according to the loosely coupled array membership information propagation mechanism explained in more detail hereafter in connection with the flow chart shown in FIG. 10.

Figure 12:
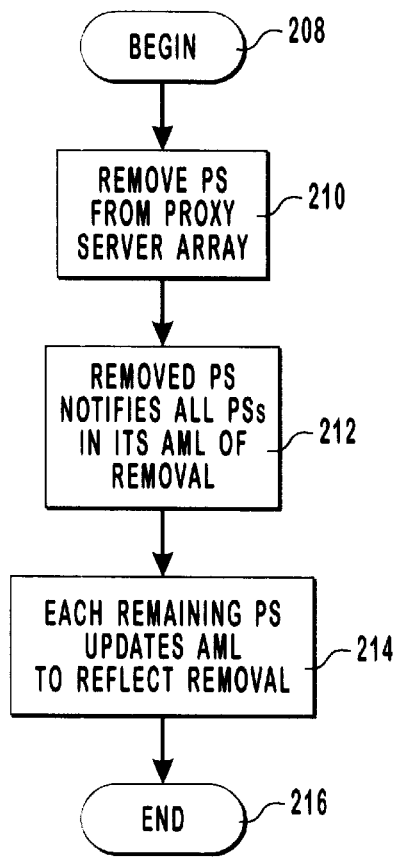
FIG. 12 is a flow chart showing the steps taken for removing a proxy server from the array.

Referring now to FIG. 9D, the removal of the first proxy server from the proxy server array is shown according to the steps explained in more detail hereafter in connection with the flow chart shown in FIG. 12. Namely, the first proxy server 168 is completely removed from the proxy server array 166 thereby leaving the second proxy server 172 and the third proxy server 176 as the only members left in the array. The data objects locally cached at the removed proxy server 168 will be redistributed or migrated equally (or equally and according to load factor) with the remaining two proxy servers. Again, the corresponding array membership lists 174 and 178 reflect the removal of the first proxy server 168.

Referring now to FIG. 10, a flow chart showing the steps taken for one method of communicating proxy server array membership information between proxy servers and to enabled clients is shown. This is done by sharing array membership lists between the proxy servers making up the array on a periodic basis so that a change made to one array membership list will eventually propagate over to the other proxy servers in the array within a relatively short period of time. Such a "loose" propagation mechanism works well within the proxy server array environment even though those skilled in the art that other methods, such as broadcasting changes to all array members may provide more immediate results.

The same general mechanism can be utilized by an enabled client to receive relevant changes in array membership information. It is important to note that the use of array membership lists and the presently explained method of communicating the array membership lists between array members constitute only one way of providing and communicating proxy server array membership information across the array and those skilled in the art will appreciate that many different ways and means may be implemented to accomplish having valid array membership information available at an enabled client or an array member so that a deterministic routing of a URL data object request may occur based on that array membership information along with the URL data object request itself.

Essentially, a time-to-live ("TTL") timer is implemented that triggers the operation of the processing steps shown in flow chart 10 for either an enabled client or a member proxy server. After processing begins at step 180, the TTL timer expires at step 182 indicating initiation of an update to the current array membership list. An array member is randomly selected from amongst the "active" proxy servers found in the current array membership list (e.g., not "marked" as temporarily unavailable) to receive a request for that proxy server's array membership list.

At step 186 a request for the array membership list of the selected array member is made. Once a response is received containing the array membership list, the proxy server will update its own array membership list with information from the newly received membership list. This may occur by direct replacement or some form of differential analysis to bring the proxy servers array membership lists up to date based on the newly received information. Finally, the TTL timer is reset at step 190 before processing ends at step 192 to allow the process to repeat itself periodically as needed. Typically, having the TTL timer expire every second or so provides enough periodic resolution to effectively propagate array membership information in a timely manner.

Proxy servers that are marked as temporarily unavailable will automatically become "unmarked" or available through each cycle of the update process. In this manner, whenever a previously unavailable proxy server becomes available, it will be detected by an enabled client or a member of the proxy server array. Essentially, when a proxy server is discovered to be temporarily unavailable, the enabled client or member of the array will not attempt any more accesses to the unavailable proxy server for the duration of the TTL time period. All marking is temporary so that only complete array membership lists are exchanged and a proxy server that continues to be unavailable will be discovered anew during the normal request processing.

Referring now to FIG. 11, the steps taken in order to add a proxy server to the proxy server array are shown. Again, many different implementations may be envisioned by those skilled in the art that will allow a proxy server to be added to the proxy server array.

After beginning at step 194, a new proxy server is designated as being added to the array at step 196. In order to make this proxy server available to other members of the array and enabled clients, the new proxy server is given access or indication of at least one existing array member at step 198 so that the new proxy server can request an array membership list from that existing proxy server at step 200.

Upon receiving the request, the existing array member returns its array membership list and the new proxy server creates its own array membership list at step 202 using knowledge of the existing array member and the received array membership list. Next, at step 203, the new proxy server notifies all members in its newly created array membership list of its existence in the proxy server array. Finally, at step 204, each existing member of the array member will update its respective array memebership list in response to the notifications sent at step 203 before processing ends at step 206.

At this point, the newly added proxy server may now begin randomly accessing all members of the array for updating its own array membership list and routing URL data object requests to the correct members of the array. As explained previously, FIG. 9B shows the state of the array previously shown in FIG. 9A after the addition of the third proxy server 176 at a point in time when the array membership information has been propagated to all array membership lists indicating the addition of the third proxy server 176.

Referring now to FIG. 12, flow chart showing the steps for removing a proxy server from a proxy server array is now shown. After beginning at step 208, a particular proxy server is designated as removed from the proxy server array at step 210.

At step 212, the designated proxy server notifies all proxy servers in its array membership list of its removal. The removed proxy server will no longer respond to requests directed thereto or may respond with some form of indication that it is no longer a member of the proxy server array until its removal has propagated to all array members and enabled clients. Each proxy server remaining in the array will receive notification from the removed proxy server at step 212 and will update its respective array membership list to reflect the removal at step 214 so that no more attempts at accessing the removed proxy server for either the array membership list or for routing of a URL data object request will be made. Finally, processing ends at step 216.

Figure 13:
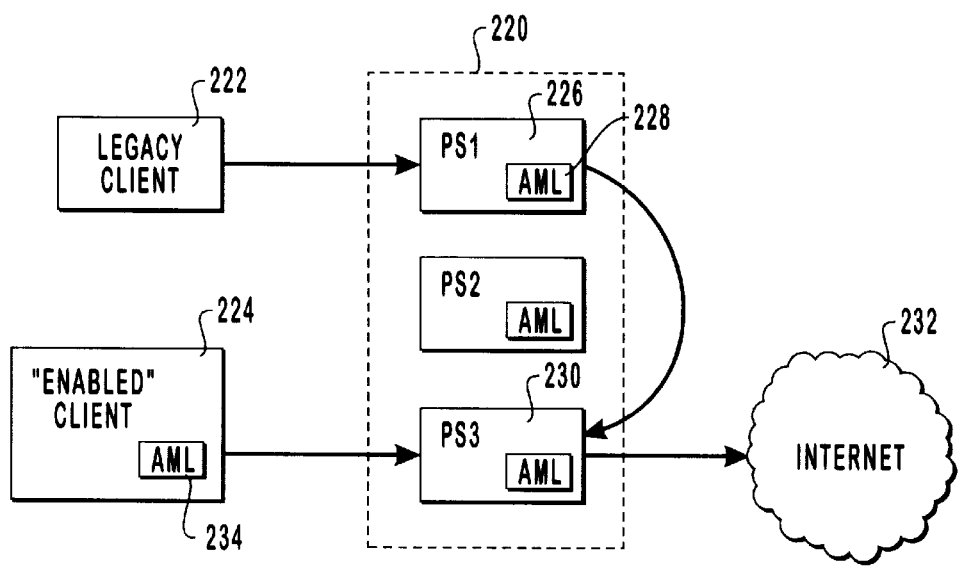
FIG. 13 is a logical diagram showing how a proxy server array according to the present invention may be used with legacy clients and enabled clients.

Referring now to FIG. 13, a logical diagram showing a proxy server array with lateral access between array members that will accommodate both legacy clients and enabled clients is presented. A legacy client 222 will access the proxy server array 220 in the traditional fashion by being assigned a specific proxy server while an enabled client 224 will utilize proxy server array member information in order to directly access the correct proxy server within the array having the desired URL data object as explained previously in connection with the logical diagram of FIG. 7 and the flow chart shown in FIG. 8.

Assume the legacy client 222 directs a URL data object request to the first proxy server 226 of the proxy server array 220 by way of assignment. The first proxy server 226 determines that the desired URL data object does not reside in its local cache and uses the URL data object request and the proxy server array 220 membership information located in the array membership list 228 to ascertain that the desired URL data object should reside at the third proxy server 230. At that point, the request will be forwarded from the first proxy server 226 to the third proxy server 230 as indicated by the arrow. This determination and forwarding of the URL data object request received from the legacy client 222 at the first proxy server 226 is done according to step 120 and step 122 of the flow chart of FIG. 6 as such processing steps are executed at the first proxy server 226.

The third proxy server 230, upon receiving the forwarded URL data object request, will, for purposes of this example, determine that the URL is not in the local cache at step 104 of FIG. 6, determine that lateral access is active at step 110, and that the request is from an array member at step 112. This basically indicates that the desired URL data object does not exist in the distributed cache and must be accessed over the Internet 232 and placed into the third proxy server 230 local cache as was explained previously as step 114 and step 116 of FIG. 6.

Finally, with the desired URL data object residing in its local cache, the third proxy server 230 may return the desired URL data object to the first proxy server 226, which in turn will service the original request from the legacy client 222. Note that the first proxy server 226 will not store an extra copy of the URL data object in its local cache.

Assuming now that the enabled client 224 desires to access the exact same URL data object, it will use the generated URL data object request and the array membership list 234 in order to make the determination that the third proxy server 230 contains the desired URL data object. This occurs as was explained previously in connection with the logical diagram shown in FIG. 7 and steps 152 and 154 of the flow chart shown in FIG. 8.

The third proxy server, upon receiving the URL request at step 102 of FIG. 6, will further determine that the desired URL data object is located in the local cache at step 104 and then directly service the URL request by returning the URL data object found in the local cache at step 106. Therefore, as shown in FIG. 13, both enabled clients such as enabled client 224, and older clients, such as legacy client 222, utilize the same logical cache from the proxy server array 220 that has the direct and lateral accessibility.

Figure 14:
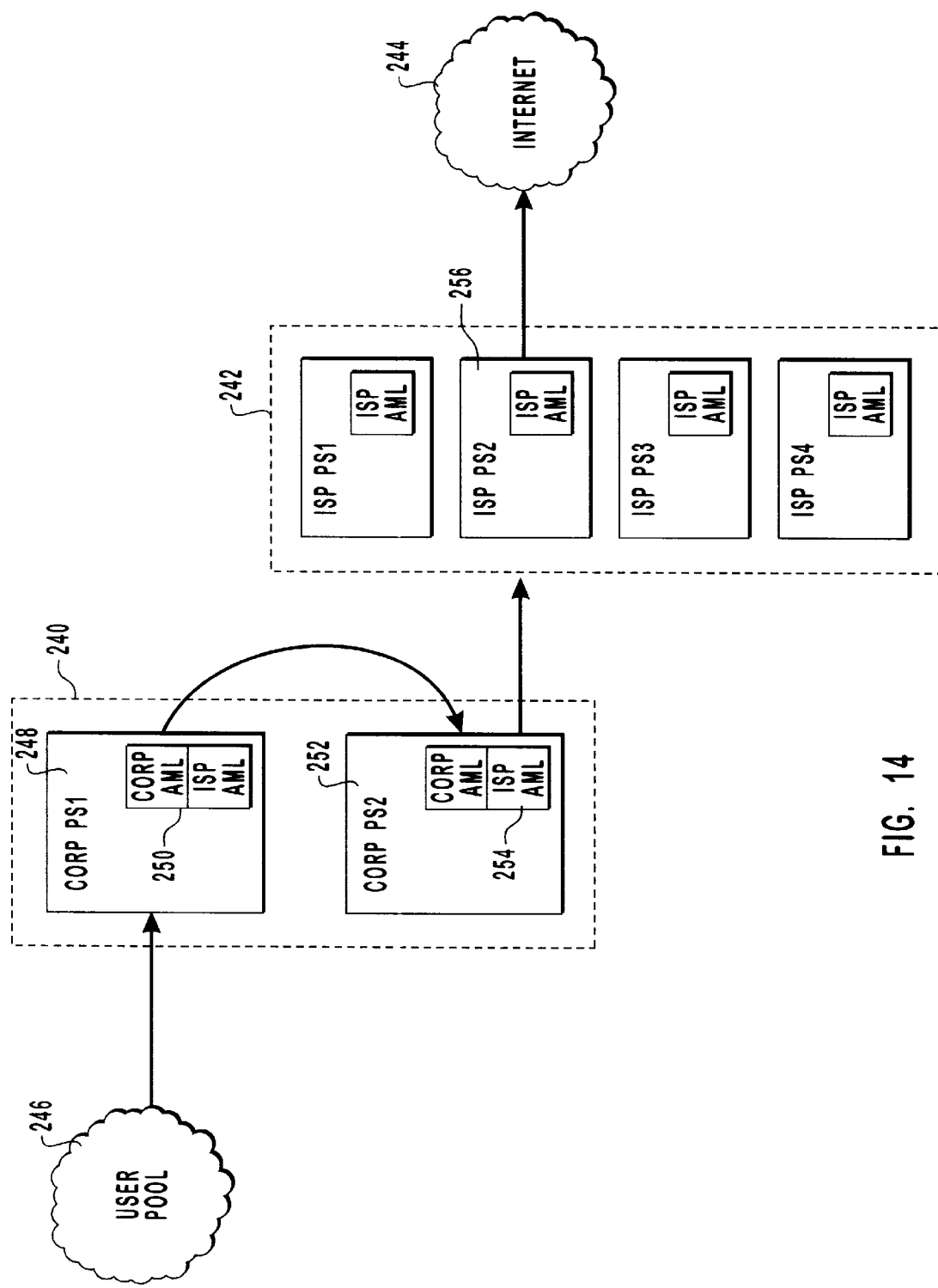
FIG. 14 is a logical diagram showing two levels of proxy server arrays according to the present invention may be used in a realistic environment where both lateral access and direct access are accomplished. A first proxy array uses lateral access within the array in order to service non-enabled or legacy clients, but in turn may directly access the proxy server array of an Internet service provider.

Referring now to FIG. 14, a logical diagram is shown wherein there is two levels of proxy server array caching, one for an internal corporate proxy server array and a second for an Internet service provider proxy server array. In the scenario illustrated in FIG. 14, a corporate proxy server array 240 is an intelligent client to the Internet service provider proxy array 242 which in turn has access to the Internet 244 in order to connect with all servers on the World Wide Web. A particular user pool 246 consisting of a group of legacy clients, such as legacy Internet browsers in a department or division, is assigned to direct requests to the first corporate proxy server 248 that is part of the corporate proxy server array 240.

Each proxy server in the corporate proxy server array 240 will have two array membership lists. The corporate array membership list will be used for managing lateral accessing in the corporate proxy server array 240 while the Internet service provider array membership list will be used by the corporate proxy server array 240 so that it may act as an intelligent client to the Internet service provider proxy server array 240. Furthermore, the Internet service provider array membership list will be used by the Internet service provider proxy server array 242 for managing lateral routing therein.

Assuming a URL data object request from the user pool 246 arriving at the first corporate proxy server 248, a determination is made at the first corporate proxy server 248 using the receive URL data object request and the corporate array membership list 250 that the desired URL data object should reside on the second corporate proxy server 252. The first corporate proxy server 248 will forward the original URL data object request to the second corporate proxy server 252 as indicated by the arrow.

Once the second corporate proxy server 252 determines that external access is required from the Internet or other upstream proxy server array, the Internet service provider array membership list 254 will be used in conjunction with the forwarded URL data object request information in order to determine exactly which proxy server in the Internet service provider proxy server array 242 will contain the desired URL data object in its local cache. Note that the second corporate proxy server 252 is acting as an enabled client in making this direct access into the Internet service provider proxy server array 242.

The result of such determination by the second corporate proxy server 252 is another forwarded URL data object request from the second corporate proxy server 252 to the second Internet service provider proxy server 256 that will in turn bring the desired URL data object into its local cache after accessing it over the Internet 244.

The response path will pass the desired URL data object from the second Internet service provider proxy server to the second corporate proxy server 252. The desired URL data object will also be stored in local cache of the second corporate proxy server 252 so that there are now two cached copies, one in the corporate proxy server array 240 and one in the Internet service provider proxy server array 242.

The second corporate proxy server 252 will respond to the first corporate proxy server array 248 with the desired URL data object. Upon receiving the response, the first corporate proxy server 248 will respond to the original URL data object request without storing the desired URL data object in its local cache to finalize the transaction chain. Those skilled in the art will recognize that may different topologies of proxy server arrays may be introduced that can be effectively serviced by the lateral and direct accessing methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a client system associated with an array of servers configured so as to provide a distributed store of data objects, a method of transmitting a request for a data object to a single server of the array that is assigned to store the data object without sending queries to each server in the array to ascertain the location of the data object, the method comprising the acts of:

providing array membership information at the client system, the array membership information including information identifying each server that is active in the array at a given time;

providing, at the client system, information identifying a data object that is to be accessed by the client system;

determining which single server of the array is assigned to store the data object by performing the acts of:

performing a first deterministic function on the information identifying the data object;

for each server, performing a second deterministic function on the information identifying the server;

combining the results of the first deterministic function with the results of the second deterministic function to generate a value for each server; and based on the relative values for the servers, deterministically identifying which single server is assigned to store the data object, without sending a query to each server to ascertain the location of the data object; and transmitting an access request for the data object to the identified single server.

2. The method of claim 1 wherein the data objects are Uniform Resource Locator ("URL") data objects, the servers are proxy servers, the store of data objects is a cache of URL data objects, and the access request is a URL data object access request.

3. The method of claim 1 wherein the first deterministic function and the second deterministic function are deterministic hash functions.

4. The method of claim 3 wherein the act of deterministically identifying which single server is assigned to store the data object comprises the steps of:

ordering the servers based on the values for the servers; and identifying the server having the highest value as being the server assigned to store the data object.

5. The method of claim 1 wherein the array membership information is contained in an array membership list that is distributed between the servers in the array and accessible to the client system.

6. The method of claim 5 wherein the step of providing array membership information at the client system comprises the acts of:

periodically requesting a new array membership list from a randomly chosen server that is listed in a current array membership list stored at the client system; and updating the current array membership list with the new array membership list.

7. A computer-readable medium having computer-executable instructions for performing the steps recited in claim 1.

8. In a client system associated with an array of proxy servers configured so as to provide a cache of uniform resource locator ("URL") data objects distributed across the array of proxy servers, a method of transmitting a request for a URL data object to a single proxy server of the array that is assigned to store the URL data object, the method comprising the acts of:

providing an array membership list at the client system, the list including names of all proxy servers that is active in the array at a given time;

providing, at the client system, a URL identifying a URL data object that is to be accessed by the client system;

determining which single proxy server of the array is assigned to store the URL data object by performing the acts of:

for each of the proxy servers that are active in the array, computing a first deterministic hash value of the name of the proxy server;

computing a second deterministic hash value of the URL;

combining, for each of the proxy servers active in the array, the first deterministic hash value and the second deterministic hash value to generate a deterministic combined hash value associated with each of the proxy servers active in the array; and based on the relative values of the deterministic combined hash values, deterministically identifying which single proxy server is assigned to store the URL data object; and transmitting a URL access request for the URL data object to the identified single proxy server.

9. The method of claim 8 wherein the act of deterministically identifying which single proxy server is assigned to store the URL data object comprises the acts of:

ordering the proxy servers based on the values for the servers; and identifying the proxy server having the highest deterministic combined hash value as being the single proxy server assigned to store the data object.

10. The method of claim 8 wherein each proxy server contains an array membership list and wherein the act of providing an array membership list at the client comprises the acts of:

periodically requesting a new array membership list from a randomly chosen proxy server that is listed in a current array membership list stored at the client system; and updating the current array membership list with the new array membership list.

11. A computer-readable medium having computer-executable instructions for performing the steps recited in claim 8.

12. In a client system associated with an array of proxy servers configured so as to provide a cache of uniform resource locator ("URL") data objects distributed across the array of proxy servers, a method of transmitting a request for a URL data object to a single proxy server of the array that is assigned to store the URL data object, the method comprising the acts of:

providing an array membership list at the client system, the list including information identifying all proxy servers that are active in the array at a given time, the list being located on each proxy server of the array, said act of providing an array membership list comprising the acts of:

periodically requesting the array membership list located at a proxy server of the array; and updating the array membership list at the client system using the requested array membership list;

in response to a URL request generated at the client system, determining which single proxy server is assigned to store a URL data object associated with the URL request without making a query to any of the proxy servers of the array, by performing the acts of:

for each of the proxy servers that are active in the array, computing a first deterministic hash value based on the information identifying the proxy server;

computing a second deterministic hash value of a URL associated with the URL request;

combining, for each of the proxy servers active in the array, the first deterministic hash value and the second deterministic hash value to generate a deterministic combined hash value for each of the proxy servers; and based on the relative values of the deterministic combined hash values, deterministically identifying which single proxy server is assigned to store the URL data object; and forwarding the URL request to the identified single proxy server.

13. A computer-readable medium having computer-executable instructions for performing the steps recited in claim 12.

14. A computer-readable medium having computer-executable components for routing a uniform resource locator ("URL") generated at a client system to a single proxy server that is assigned to store a URL data object associated with the URL request, the single proxy server being part an array of proxy servers configured so as to provide a distributed cache of URL data objects, the components comprising:

a request generating component for originating or forwarding a URL request that includes a URL associated with a URL data object that is to be accessed by the client system;

a proxy server identification component for deterministically identifying which single proxy server in the array is assigned to store the URL data object associated with the URL without sending queries to the all of the proxy servers in the array, including performing the acts of:

for each of the proxy servers that are active in the array, computing a first deterministic hash value of a name of the proxy server;

computing a second deterministic hash value of the URL;

combining, for each of the proxy servers active in the array, the first deterministic hash value and the second deterministic hash value to generate a deterministic combined hash value associated with each of the proxy servers active in the array; and based on the relative values of the deterministic combined hash values, deterministically identifying which single proxy server is assigned to store the URL data object; and a routing component to route the generated URL request to the identified single proxy server.

15. A system of server computers configured into a distributed cache for holding Uniform Resource Locator ("URL") data objects and client computers that access the distributed cache, wherein a URL request generated at a client computer can be routed directly to the server computer that is assigned to store the requested URL data object without queries being made to any other server computer, the system comprising:

at least two server computers, each server computer comprising:

a CPU;

storage means, electronically coupled and responsive to said CPU, said storage means containing membership information including information identifying all server computers included in the distributed cache;

means, electronically coupled and responsive to said CPU, for receiving URL requests from clients of the distributed cache; and at least one client computer being a client of the distributed cache, said client computer comprising:

a CPU;

storage means, electronically coupled and responsive to said CPU, said storage means containing membership information including information identifying all server computers included in the distributed cache;

means, electronically coupled and responsive to said CPU, for generating a URL request;

means, electronically coupled and responsive to said CPU, for deterministically identifying which single server computer in the distributed cache is assigned to store a URL data object associated with the URL request by performing the acts of:

for each of the servers computers in the array, computing a first deterministic hash value of the information identifying the server computer;

computing a second deterministic hash value of a URL that is associated with the URL request;

combining, for each of the server computers, the first deterministic hash value and the second deterministic hash value to generate a deterministic combined hash value associated with each of the server computers; and based on the relative values of the deterministic combined hash values, deterministically identifying which single server computer is assigned to store the URL data object; and means, electronically coupled and responsive to said CPU, for routing the URL request to the identified single server computer.

16. A method as recited in claim 1, wherein the act of combining the results of the first deterministic function with the results of the second deterministic function to generate a value for each server comprises the act of using a third deterministic function selected so as to assign the data objects substantially evenly among the servers in the array.

17. A method as recited in claim 1, wherein the act of combining the results of the first deterministic function with the results of the second deterministic function to generate a value for each server comprises the act of using a third deterministic function selected so as to assign the data objects with relative load factors among the servers in the array.

* * * * *

UNITED STATES PATENT AND TRADEMARK OFFICE
CERTIFICATE OF CORRECTION

PATENT NO.   : 6,311,216 B1
DATED        : October 30, 2001
INVENTOR(S)  : Brian J. Smith and Hans Hurvig It is certified that error appears in the above-identified patent and that said Letters Patent is hereby corrected as shown below:

Column 7,
Line 8, change "data base" to -- datebase --
Line 41, after "object access" delete [s]

Column 21,
Line 10, after "that" change "may" to -- many --

Signed and Sealed this

Seventh Day of May, 2002

Attest:

JAMES E. ROGAN
Attesting Officer        Director of the United States Patent and Trademark Office